Jan. 21, 1930.  W. R. GILLESPIE  1,744,161
INTERNAL COMBUSTION ENGINE
Filed Nov 17, 1927
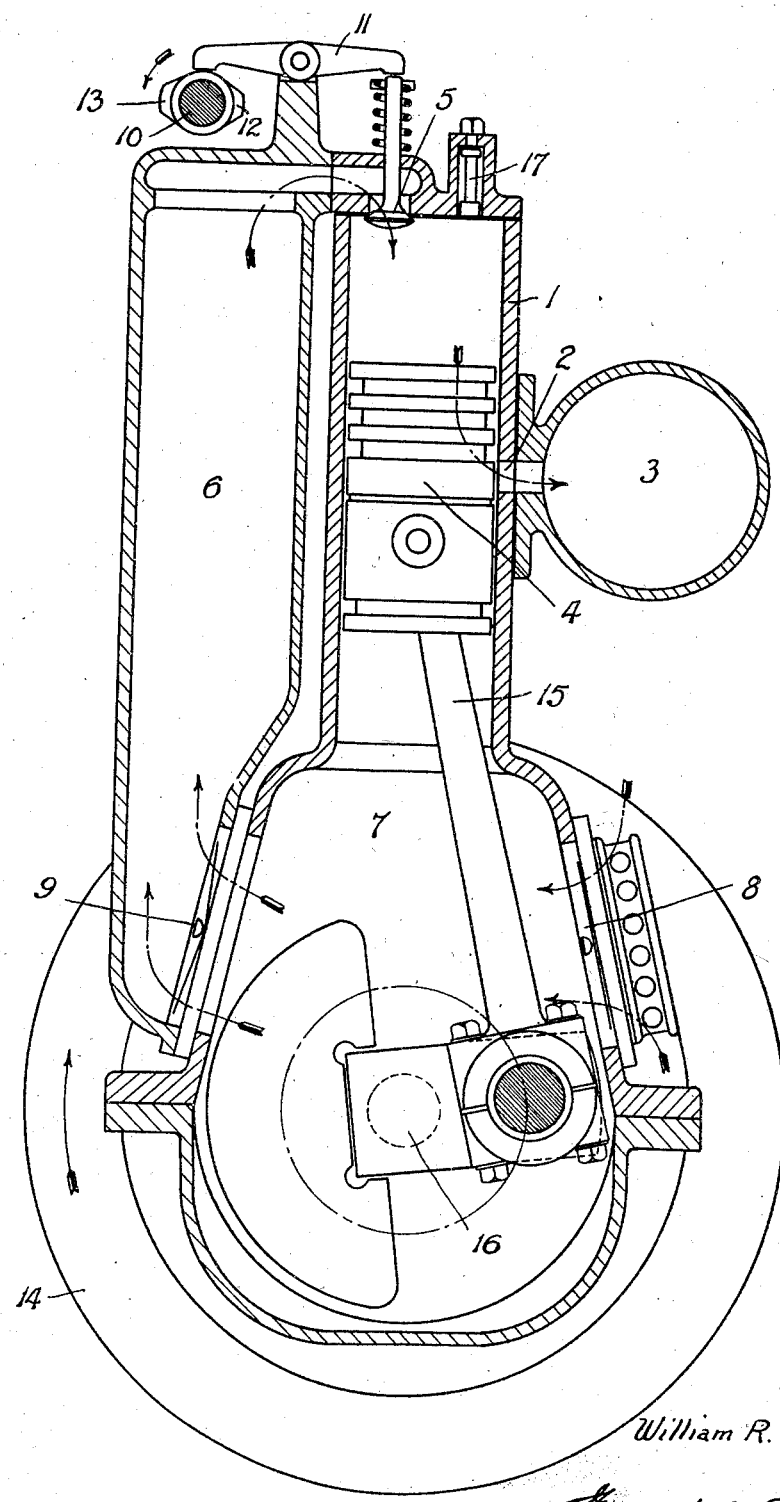
INVENTOR
William R. Gillespie
Howard A. Coombs
ATTORNEY.

Patented Jan. 21, 1930

1,744,161

UNITED STATES PATENT OFFICE

WILLIAM ROBERT GILLESPIE, OF CHISWICK, LONDON, ENGLAND

INTERNAL-COMBUSTION ENGINE

Application filed November 17, 1927, Serial No. 233,900, and in Great Britain November 23, 1926.

This invention relates to internal combustion engines of the type in which a charge of air only is compressed in the cylinder of the engine during the compression stroke, liquid fuel being injected at or near the end of this stroke.

The invention is particularly applicable to engines of the above character of relatively low power and intended to be operated at a relatively high speed and has for its object to provide an improved construction which shall be simple, efficient and cheap to manufacture.

Accordingly the improved engine of the invention is arranged to operate on a four-stroke cycle thus reducing the speed of action of the fuel injection mechanism and enabling more effective scavenging and cooling of the cylinder to be obtained. Furthermore the exhaust of the products of combustion from the cylinder is arranged to be effected through one or more ports in the cylinder wall which are uncovered by the piston towards the end of its outward stroke.

Further features of the invention relate to the admission of a scavenging charge of air under pressure through a valve in or near the cylinder head and the subsequent admission of air under pressure in a similar manner at or prior to the beginning of the compression stroke.

The invention will now be described, by way of example, with reference to the accompanying drawing the single figure of which is a view of one constructional form of engine embodying the various features of the invention.

Referring now to the drawing the cylinder 1 of the engine is provided with a ring or row of exhaust ports 2 in the cylinder wall these ports leading to an exhaust conduit or chamber 3 and being uncovered by the piston 4 at or near the end of each outward stroke. At the opposite end of the cylinder 1 an air inlet valve 5 is provided adapted to establish communication between the interior of the cylinder and an air reservoir 6 adjacent to the cylinder, this reservoir being supplied with air under pressure from the crank-case 7 of the engine by the action of the piston 4 in the well known manner. The volumetric capacity of the air reservoir 6 may be equal to or greater than that of the crank-case 7 while the combined capacity of the reservoir 6 and crank-case 7 may be approximately seven times that of the piston displacement.

The crank-case 7 is in communication with the external air through an automatic valve 8 of large effective area and small lift, the air compressed in the crank-case 7 passing to the reservoir 6 through a suitable non-return valve 9.

The inlet valve 5 is arranged to be mechanically actuated from a half-time shaft 10 by means of a rocking member 11 and cams 12 and 13 which are of such form as to cause the inlet valve 5 to be opened to a different extent or for a different period twice in each cycle to permit the supply of air to the cylinder 1 in the manner which will now be explained.

During the power stroke, the piston 4 is moving outwards in the cylinder 1 under the action of the burning fuel and is causing the air compressed in the crank-case 7 to flow into the reservoir 6 past the non-return valve 9, the fly-wheel 14 of the engine being caused to rotate, through the intermediary of the connecting rod 15 and crankshaft 16, in the direction of the arrow.

At or about the point in the stroke at which the piston 1 uncovers the exhaust ports 2 so as to release the products of combustion from the cylinder 1 the air inlet valve 5 is opened by the cam 12 on the shaft 10, which is arranged to be rotated in the direction of the arrow to admit a scavenging charge of air from the reservoir 6, which flowing in the same direction within the cylinder 1 as the escaping products of combustion is particularly effective in sweeping the cylinder free of burnt gases while also having a cooling effect on the cylinder walls. The passage of air from the reservoir 6 to the cylinder 1 causes a fall in the reservoir pressure thus permitting more air to enter the reservoir from the crankcase 7.

The amount of air admitted to the cylinder 1 as above described is arranged to be less than that required to fill the cylinder at reservoir pressure, the form of the cam 12 effecting this opening of the inlet valve being suitably designed for this purpose.

During the succeeding inward stroke of the piston 4 the latter first covers the exhaust ports 2 and then lightly compresses the cylinder contents, the piston 4 also during this stroke drawing in a fresh charge of air into the crank-case 7 through the valve 8.

During the next outward stroke the piston 4 compresses the air in the crank-case 7 into the reservoir 6 and at the end of the stroke the exhaust ports 2 being uncovered by the piston 4 the contents of the cylinder 1 are allowed to escape to the exhaust conduit or chamber 3.

Before the end of this stroke, however, the inlet valve 5 is again opened by the cam 13 which is so formed as to permit full equalization of the reservoir pressure into the cylinder 1, the inlet valve 5 remaining open until after the exhaust ports 2 are again covered by the piston 4 during its next inward or compression stroke.

It will thus be evident that this full admission of air from the reservoir 6 to the cylinder 1 not only sweeps out (so long as the exhaust ports 2 are uncovered) the previous contents of the cylinder 1 consisting of the air previously admitted and any traces of burnt gas, but after the exhaust ports 2 are covered charges the cylinder 1 with air at reservoir pressure at the beginning of the compression stroke.

This charge of air is further compressed to the final compression pressure during the next piston stroke thus completing the cycle, liquid fuel being arranged to be injected into the cylinder 1 through the device 17 at or near the end of this stroke, whereupon the piston is caused to repeat the series of operations described above.

It will be observed that during all stages of the cycle, the flow of air through the crank-case 7, reservoir 6 and cylinder 1 of the engine always takes place in the same direction, that is to say, in the direction of the arrows in the drawing, thus avoiding loss of energy due to the momentum of the gases.

The degree of pressure in the reservoir 6 will evidently depend upon the conditions of operation, but in practice a pressure of approximately two or three pounds per square inch above atmospheric pressure is found to be sufficient to attain the results desired.

Having now described my invention, what I claim as new and desire to secure by Letters Patent, is:—

1. An internal combustion engine of the 4-stroke cycle type, comprising a cylinder, a piston therein, a reservoir, means for compressing air in said reservoir, means for scavenging the cylinder with air from the reservoir supplied to the cylinder in the direction of the escaping products of combustion at the end of the power stroke, means for permitting the escape to atmosphere of the contents of the cylinder during the idle stroke of the piston within the cylinder in the same direction as the power stroke, and means for supplying air from the reservoir to the cylinder prior to the compression stroke of the piston.

2. An internal combustion engine of the 4-stroke cycle type, comprising a cylinder, a piston therein, means for compressing a charge of air within the cylinder during the compression stroke of the piston, means for injecting liquid fuel into the cylinder at the end of said stroke, a reservoir, means for compressing air in said reservoir, means for scavenging the cylinder with air from the reservoir supplied to the cylinder in the direction of the escaping products of combustion at the end of the power stroke, means for permitting the escape to atmosphere of the contents of the cylinder during the idle stroke of the piston within the cylinder in the same direction as the power stroke, and means for supplying air from the reservoir to the cylinder prior to the compression stroke of the piston.

3. An internal combustion engine, comprising a cylinder, a piston within said cylinder, a reservoir, a valve controlling communication between said reservoir and cylinder, means for opening said valve at the end of the power stroke of the piston for a time sufficient to permit the admission, at the end of said stroke of the piston, of an amount of air less than that required to fill the cylinder at the reservoir pressure, means for maintaining said valve closed during the next stroke in the opposite direction of the piston, and means for opening said valve during the idle stroke of the piston in the same direction as the power stroke and prior to the beginning of the compression stroke of the piston for a time sufficient to permit equalization of the pressures in the reservoir and in the cylinder.

In testimony whereof I have hereunto set my hand.

WILLIAM ROBERT GILLESPIE.